US011334366B2

(12) United States Patent
He

(10) Patent No.: US 11,334,366 B2
(45) Date of Patent: May 17, 2022

(54) METHOD AND DEVICE FOR RECOGNIZING APPARATUS AND COMPUTER READABLE STORAGE MEDIUM AND PROGRAM

(71) Applicant: Siemens Aktiengesellschaft, Munich (DE)

(72) Inventor: Junhu He, Zhenjiang (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/279,193

(22) PCT Filed: Sep. 30, 2018

(86) PCT No.: PCT/CN2018/109064
§ 371 (c)(1),
(2) Date: Mar. 24, 2021

(87) PCT Pub. No.: WO2020/062227
PCT Pub. Date: Apr. 2, 2020

(65) Prior Publication Data
US 2021/0311746 A1     Oct. 7, 2021

(51) Int. Cl.
*G06F 9/4401*     (2018.01)
*G06F 11/34*     (2006.01)
(Continued)

(52) U.S. Cl.
CPC ........ *G06F 9/4413* (2013.01); *G06F 11/3409* (2013.01); *G06F 13/385* (2013.01); *G06F 13/4063* (2013.01)

(58) Field of Classification Search
CPC .. G06F 9/4413; G06F 11/3409; G06F 13/385; G06F 13/4063
See application file for complete search history.

(56) References Cited

U.S. PATENT DOCUMENTS 6,105,093 A * 8/2000 Rosner ................. G06F 13/385
710/105
2001/0042103 A1* 11/2001 Tomari ................ H04M 1/7243
709/206
(Continued)

FOREIGN PATENT DOCUMENTS

CN     105472708 A     4/2016

OTHER PUBLICATIONS

International Search Report PCT/ISA/210 for International Application No. PCT/CN2018/109064 dated Jun. 27, 2019.
(Continued)

*Primary Examiner* — Henry Tsai
*Assistant Examiner* — Aurangzeb Hassan
(74) *Attorney, Agent, or Firm* — Harness, Dickey & Pierce, P.L.C.

(57) ABSTRACT

A method and device are for recognizing an apparatuses and computer readable storage medium and program are provided. In an embodiment, the method includes reading a combined sequence table including candidate device information, candidate communication parameters and historical occurrence numbers of combinations of the candidate device information and the candidate communication parameters for each candidate device information; determining priority levels of the combinations according to the historical occurrence numbers; and determining a current combination according to the priority levels, sending a message to the apparatus to be recognized by using a candidate communication parameter in the current combination, and determining whether the current combination is the correct combination capable of establishing a communication with the apparatus to be recognized according to a feedback from the apparatus to be recognized. The recognition efficiency may (Continued)

be improved effectively and the recognition time may be shortened significantly through the method.

19 Claims, 2 Drawing Sheets

(51) Int. Cl.
    *G06F 13/38* (2006.01)
    *G06F 13/40* (2006.01)

(56) References Cited

U.S. PATENT DOCUMENTS

| | | | |
|---|---|---|---|
| 2003/0101338 | A1 | 5/2003 | Mullen et al. |
| 2003/0204633 | A1 | 10/2003 | Dykes et al. |
| 2006/0153192 | A1 | 7/2006 | Pohlabel et al. |
| 2006/0212679 | A1* | 9/2006 | Alfano .............. G06F 1/08 |
| | | | 712/38 |
| 2007/0226377 | A1* | 9/2007 | Jreij ............... G06F 13/385 |
| | | | 710/8 |
| 2014/0204925 | A1* | 7/2014 | Otomo .............. H04W 68/04 |
| | | | 370/338 |
| 2014/0235228 | A1* | 8/2014 | Hirako .......... H04W 52/0258 |
| | | | 455/418 |
| 2014/0369396 | A1* | 12/2014 | Tanaka ............... H04B 3/46 |
| | | | 375/228 |
| 2015/0257062 | A1* | 9/2015 | Hara ............. H04W 36/0083 |
| | | | 370/331 |
| 2016/0132608 | A1* | 5/2016 | Rathod .............. H04W 4/21 |
| | | | 707/722 |
| 2016/0135205 | A1* | 5/2016 | Barbu .............. H04W 48/20 |
| | | | 370/338 |
| 2016/0365934 | A1* | 12/2016 | Maeda .............. H04B 17/309 |
| 2019/0155998 | A1* | 5/2019 | Yamaguchi ......... G06Q 50/10 |
| 2019/0320374 | A1* | 10/2019 | Kato ................ H04W 88/06 |
| 2019/0349368 | A1* | 11/2019 | Hegde ............. H04L 63/0876 |
| 2020/0065917 | A1* | 2/2020 | Kurihara ............. G08G 1/00 |
| 2021/0021131 | A1* | 1/2021 | Hanayama .......... H01M 10/44 |

OTHER PUBLICATIONS

Written Opinion PCT/ISA/237 for International Application No. PCT/CN2018/109064 dated Jun. 27, 2019.

* cited by examiner

METHOD AND DEVICE FOR RECOGNIZING APPARATUS AND COMPUTER READABLE STORAGE MEDIUM AND PROGRAM

PRIORITY STATEMENT

This application is the national phase under 35 U.S.C. § 371 of PCT International Application No. PCT/CN2018/109064 which has an International filing date of Sep. 30, 2018, which designated the United States of America, the entire contents of which are hereby incorporated herein by reference.

FIELD

Embodiments of the disclosure generally relate to an apparatus recognizing field, more particularly, relates to a method and device for recognizing an apparatus, and a computer readable storage medium and program.

BACKGROUND ART

Plug and Play is an important feature of a modern Internet of Things (IoT) router, a serial port and a bus are common interfaces for connecting an apparatus to the IoT routers. In order to detect the apparatus automatically, the router must try different communication parameters one by one to establish a successful connection with the apparatus.

When connecting, the communication between the router and the apparatus is required to try a list of all communication parameters pre-stored in the router. For example, in order to build a successful connection between the router and the apparatus, the router may be configured with a baud rate and a device address.

Although there are many combinations of the baud rates and the device addresses, the connection is established by only one effective combination. The router is required to try to send a message to the connecting port based on a combination over and over again when recognizing the apparatus. If the connecting port responds to the router, the sent combination contains the correct baud rate and device address to recognize the apparatus. If the router does not receive a response, the router continues to try to send the next combination, which is inefficient and time consuming.

SUMMARY

To this end, the present disclosure provides a method and a device for recognizing an apparatus for improving the efficiency of apparatus recognition and shortening the time taken for recognition.

According to an embodiment of the disclosure, a method for recognizing a device is provided, the method may include: reading a combined sequence table including candidate device information, candidate communication parameters and historical occurrence numbers of combinations of the candidate device information and the candidate communication parameters; determining priority levels of the combinations according to the historical occurrence numbers; and determining a current combination according to the priority levels, sending a message to the apparatus to be recognized by using a candidate communication parameter in the current combination, and determining whether the current combination is a correct combination capable of establishing a communication with the apparatus to be recognized according to a feedback from the apparatus to be recognized. By setting the priority levels of the communication parameters in the combined sequence table, the messages may be attempted to be sent sequentially according to the priority levels when recognizing the apparatus, so that the possibility of correct recognition operation for the previous several attempts may be improved, the device recognition efficiency is improved, and the device recognition time is significantly shortened.

According to another embodiment, a device for recognizing an apparatus is also provided, which includes a processor and a memory having application programs stored therein such that the method as described above is performed by the processor.

According to another embodiment, a computer readable storage medium is also provided, which has computer readable instructions stored therein for performing the method as described above.

According to another embodiment, a computer program is also provided, which includes computer readable instructions, such that the method as described above is performed by at least one of processes when the computer readable instructions are executed.

According to another embodiment, a computer program product is also provided, which is tangibly stored on a computer readable medium and comprising computer executable instructions, such that the method as described above is performed by at least one of processes when the computer readable instructions are executed.

BRIEF DESCRIPTION OF DRAWINGS

The detailed embodiments of the disclosure will be described with reference to the drawings, the features and advantages above and others of the disclosure will be more apparent to this skilled in the art, wherein.

LIST OF REFERENCE NUMERALS

Figure 1:
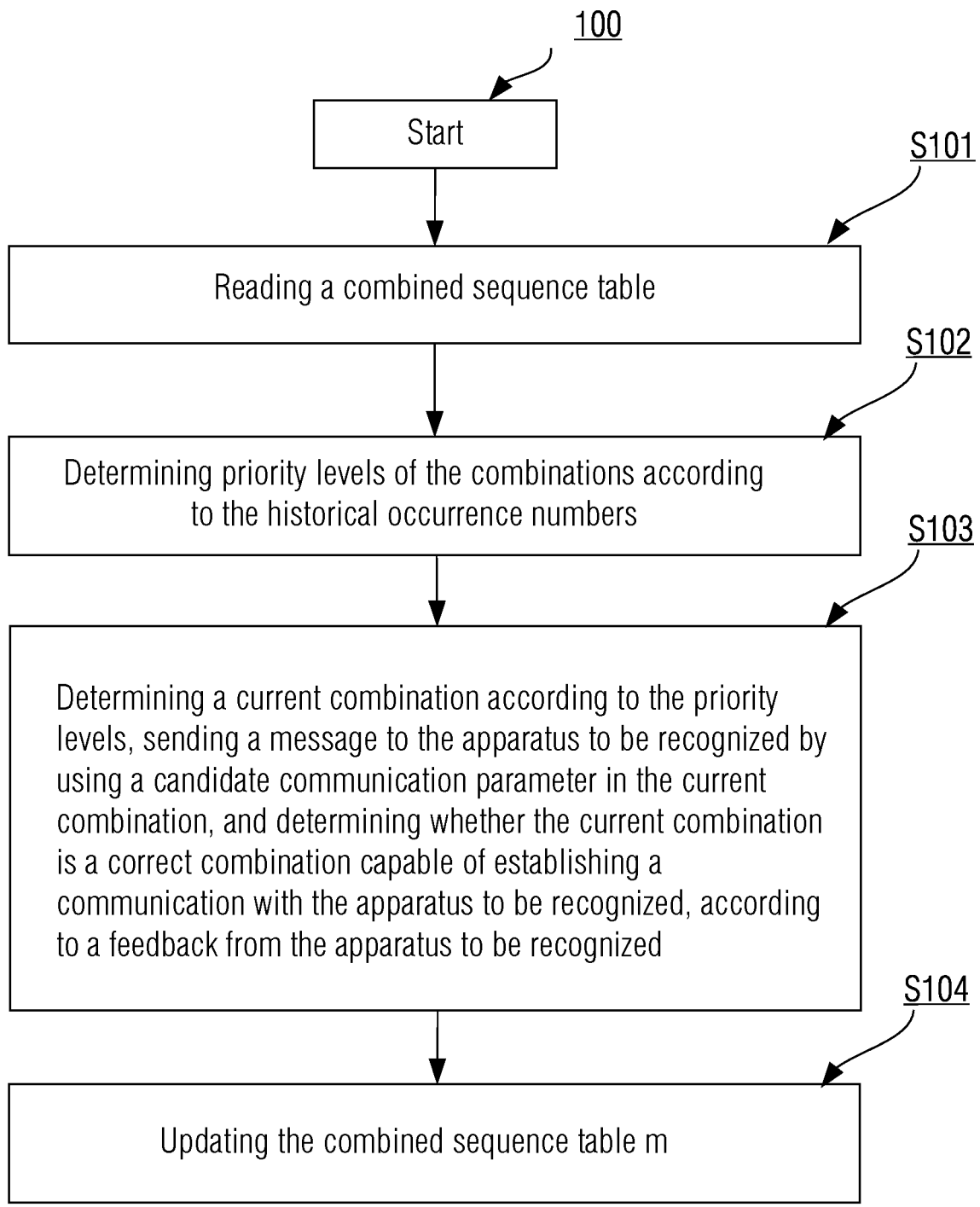
FIG. 1 is a flowchart of a method for recognizing an apparatus according to an embodiment of the disclosure.
Figure 2:
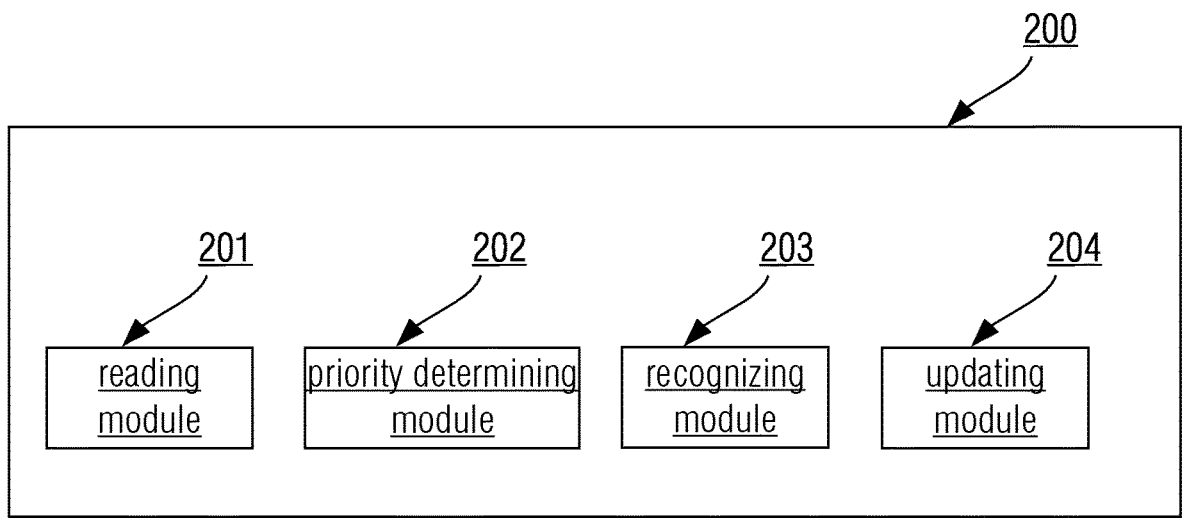
FIG. 2 is a schematic diagram of a device for recognizing an apparatus according to an embodiment of the disclosure.

S101, S102, S103, S104: steps
200, 300: device for recognizing an apparatus,
201: reading module,
202: priority determining module,
203: recognizing module,
204: updating module,
301: processor, and
302: memory.

DETAILED DESCRPITION OF THE EXAMPLE EMBODIMENTS

According to another embodiment, a device for recognizing an apparatus is provided, the device includes: a reading module configured to read a combined sequence table including candidate device information, candidate communication parameters and historical occurrence numbers of combinations constituted of the candidate device information and the candidate communication parameters for each candidate device information; a priority determining module configured to determine priority levels of the combinations according to the historical occurrence numbers; and a recognizing module configured to determine a current combination according to the priority levels, send a message to the apparatus to be recognized by using a candidate communication parameter in the current combination, and determine whether the current combination is the correct combination capable of establishing a communication with the apparatus to be recognized according to a feedback from the apparatus to be recognized. By setting the priority levels of the communication parameters in the combined sequence table, the messages may be attempted to be sent sequentially according to the priority levels when recognizing the apparatus, so that the possibility of correct recognition operation for the previous several attempts may be improved, the device recognition efficiency is improved, and the device recognition time is significantly shortened.

According to an embodiment of the disclosure, a method for recognizing a device is provided, the method may include: reading a combined sequence table including candidate device information, candidate communication parameters and historical occurrence numbers of combinations of the candidate device information and the candidate communication parameters; determining priority levels of the combinations according to the historical occurrence numbers; and determining a current combination according to the priority levels, sending a message to the apparatus to be recognized by using a candidate communication parameter in the current combination, and determining whether the current combination is a correct combination capable of establishing a communication with the apparatus to be recognized according to a feedback from the apparatus to be recognized. By setting the priority levels of the communication parameters in the combined sequence table, the messages may be attempted to be sent sequentially according to the priority levels when recognizing the apparatus, so that the possibility of correct recognition operation for the previous several attempts may be improved, the device recognition efficiency is improved, and the device recognition time is significantly shortened.

In an embodiment, the determining whether the current combination is the correct combination capable of establishing a communication with the apparatus to be recognized according to a feedback from the apparatus to be recognized may include: determining the current combination is the correct combination capable of establishing a communication with the apparatus to be recognized in case of receiving an answer signal fed back from the apparatus to be recognized. Thus, whether the recognition is correct or not may be confirmed directly through whether the apparatus to be recognized sends an answer signal.

In an embodiment, the method may further include updating the combined sequence table so that the historical occurrence number of the current combination is increased by one after determining the current combination is the correct combination capable of establishing a communication with the apparatus to be recognized. Thus, as the device recognition is performed, the combined sequence table is automatically updated in real time to improve the probability of correct recognition of the apparatus with the message sent for the first time, and shorten the device recognition time.

In an embodiment, the determining priority levels of the combinations according to the historical occurrence numbers may include: calculating an occurrence probability of each combination according the occurrence number of each combination and the total occurrence number of the combinations; and determining the priority levels of the combinations according the occurrence probabilities in descending order. To this end, the priority levels may be assigned for each communication parameter based on the combined sequence table containing the occurrence numbers.

In an embodiment, the determining the priority levels of the combinations according the occurrence probabilities in descending order may include: establishing a one-dimensional array consisting of the combinations; and reordering all combinations in the one-dimensional array in descending order according to the occurrence probabilities of the combinations, wherein the determining the current combination comprising determining the current combination from front to back based on the reordered one-dimensional array. By constructing the array containing priority levels, the recognition from the beginning to the end of the combined sequence table may be prevented, while the apparatus recognition may be started from the communication parameter having a higher occurrence probability, thereby contributing to improve recognition efficiency.

In addition, the one-dimensional array may be reordered in descending order of priority when reordering the one-dimensional after the one-dimensional array is calculated. However, it is still started from the communication parameter with the highest priority when sending messages to the apparatus to be recognized subsequently using the communication parameters.

In an embodiment, the combined sequence table may be created based on historical statistics data.

In an embodiment, the communication parameters may include baud rate and/or device address information.

According to another embodiment, a device for recognizing an apparatus is provided, the device includes: a reading module configured to read a combined sequence table including candidate device information, candidate communication parameters and historical occurrence numbers of combinations constituted of the candidate device information and the candidate communication parameters for each candidate device information; a priority determining module configured to determine priority levels of the combinations according to the historical occurrence numbers; and a recognizing module configured to determine a current combination according to the priority levels, send a message to the apparatus to be recognized by using a candidate communication parameter in the current combination, and determine whether the current combination is the correct combination capable of establishing a communication with the apparatus to be recognized according to a feedback from the apparatus to be recognized. By setting the priority levels of the communication parameters in the combined sequence table, the messages may be attempted to be sent sequentially according to the priority levels when recognizing the apparatus, so that the possibility of correct recognition operation for the previous several attempts may be improved, the device recognition efficiency is improved, and the device recognition time is significantly shortened.

In an embodiment, the recognizing module may be further configured to determine the current combination is the correct combination capable of establishing a communication with the apparatus to be recognized in case of receiving an answer signal fed back from the apparatus to be recognized. Thus, whether the recognition is correct or not may be confirmed directly through whether the apparatus to be recognized sends an answer signal.

In an embodiment, the device may further include an updating module configured to update the combined sequence table so that the historical occurrence number of the current combination is increased by one after determining the current combination is the correct combination capable of establishing a communication with the apparatus to be recognized. Thus, as the device recognition is performed, the combined sequence table is automatically updated in real time to improve the probability of correct recognition of the apparatus with the message sent for the first time, and shorten the device recognition time.

In an embodiment, the priority determining module may be further configured to calculate an occurrence probability of each combination according the occurrence number of each combination and the total occurrence number of the combinations, and determine the priority levels of the combinations according the occurrence probabilities in descending order. To this end, the priority levels may be assigned for each communication parameter based on the combined sequence table containing the occurrence numbers.

In an embodiment, the priority determining module may be further configured to establish a one-dimensional array consisting of the combinations, and reorder all combinations in the one-dimensional array in descending order according to the occurrence probabilities of the combinations, wherein the recognizing module is further configured to determine the current combination from front to back based on the reordered one-dimensional array. By constructing the array containing priority levels, the recognition from the beginning to the end of the combined sequence table may be prevented, while the apparatus recognition may be started from the communication parameter having a higher occurrence probability, thereby contributing to improve recognition efficiency.

According to another embodiment, a device for recognizing an apparatus is also provided, which includes a processor and a memory having application programs stored therein such that the method as described above is performed by the processor.

According to another embodiment, a computer readable storage medium is also provided, which has computer readable instructions stored therein for performing the method as described above.

According to another embodiment, a computer program is also provided, which includes computer readable instructions, such that the method as described above is performed by at least one of processes when the computer readable instructions are executed.

According to another embodiment, a computer program product is also provided, which is tangibly stored on a computer readable medium and comprising computer executable instructions, such that the method as described above is performed by at least one of processes when the computer readable instructions are executed.

The present disclosure will be described in further detail hereinafter in combination with various embodiments so as to make the purposes, technical solutions and advantages of the present disclosure more comprehensible.

When a port apparatus or device (referred as an apparatus) is connected to a router (for example, an IoT router), the connected apparatus is required to be recognized. The router may send a message to the connection port of the apparatus using a communication parameter, and the apparatus is recognized according to a feedback from the apparatus.

A method 100 for recognizing an apparatus is provided according to an embodiment of the present disclosure, and may be performed after the apparatus to be recognized is connected to the router via a connection port. The method 100 may be implemented by programs and executed by a controller or a microprocessor, these programs or other data may be stored in a memory.

When recognizing the port apparatus, the message sent by the router to the apparatus or device to be recognized may use information such as candidate communication parameter information (hereinafter referred as communication parameter) and candidate device information (hereinafter referred as device information), and a combined sequence table may be constituted by the combinations of the information, the device to be recognized may be one type of the candidate devices in the combined sequence table. For example, the device information (device 1, device 2, . . . ) and the communication parameter information (Para1, Para2, . . . ) are contained in the combined sequence table as shown in Table 1 below, wherein $N_{ij}$ indicates the historical occurrence number of the communication parameter i with respect to the device information j.

Specifically, the communication parameter information may include a baud rate, a device address and the like. The combined sequence table may be a two-dimensional table representing combinations of the device information and the communication parameter information, or a three-dimensional table representing, for example, combinations of the device information, the baud rate and the device address. It should be anticipated by those skilled in the art that the communication parameter information is not limited to the above information, and the dimensions of the combined sequence table may vary depending on the type of communication parameters.

TABLE 1

| | Device 1 | Device 2 | Device 3 | Device 4 | ... | Device j | ... | Device b |
|---|---|---|---|---|---|---|---|---|
| Para 1 | $N_{11}$ | $N_{12}$ | $N_{13}$ | $N_{14}$ | ... | $N_{1j}$ | ... | $N_{1b}$ |
| Para 2 | $N_{21}$ | $N_{22}$ | $N_{23}$ | $N_{24}$ | ... | $N_{2j}$ | ... | $N_{2b}$ |
| Para 3 | $N_{31}$ | $N_{32}$ | $N_{33}$ | $N_{34}$ | ... | $N_{3j}$ | ... | $N_{3b}$ |
| Para 4 | $N_{41}$ | $N_{42}$ | $N_{43}$ | $N_{44}$ | ... | $N_{4j}$ | ... | $N_{4b}$ |
| ... | ... | ... | ... | ... | ... | ... | ... | ... |
| Para i | $N_{i1}$ | $N_{i2}$ | $N_{i3}$ | $N_{i4}$ | ... | $N_{ij}$ | ... | $N_{ib}$ |
| ... | ... | ... | ... | ... | ... | ... | ... | ... |
| Para a | $N_{a1}$ | $N_{a2}$ | $N_{a3}$ | $N_{a4}$ | ... | $N_{aj}$ | ... | $N_{ab}$ |

The method and the device for recognizing an apparatus according to an embodiment of the present disclosure will be described in detail hereafter in conjunction with the drawings.

FIG. 1 is a flowchart of the method 100 for recognizing an apparatus according to an embodiment of the present disclosure.

The combined sequence table in Table 1 above may be read as shown in block S101 of FIG. 1. The combined sequence table may include a plurality of candidate device information and a plurality of candidate communication parameter information Para which may be communicated to the IoT router, and historical occurrence number $N_{ij}$ of the combinations of the device information j and the communication parameter i (wherein, i and j both are positive integer), that is the historical occurrence number of the corresponding correct communication parameter or the historical occurrence number of a device using one communication parameter as for one device to be recognized.

The priority levels of these combinations may then be determined based on the occurrence numbers of all combinations of the device information and the communication parameters, as shown in block S102. For example, the combinations may be sorted by priority in descending order according to the occurrence numbers of the combinations of all the device information and the communication parameters. The current combination is then determined when recognizing the device in such order, the message is sent to the apparatus to be recognized by using the communication parameter of the current combination, that is, the message whenever being sent to the apparatus to be recognized uses the communication parameter of a certain combination. That is, the communication parameter in the combination of the device information and the communication parameter with the biggest occurrence number or the communication parameter corresponding to such combination may be used to send a first message to the device to be recognized, wherein such combination may be referred as the current combination used to recognize the device currently, thereby the success probability of the first recognition may be increased.

Specifically, an occurrence probability may be calculated for each combination of the device information and the communication parameters in the combined sequence table. For example, the following equation (1) may be used for calculation:

$$P_{ij} = \frac{N_{ij}}{\sum_{ab} N_{ab}} \quad \text{Equation (1)}$$

Wherein, $P_{ij}$ is the occurrence probability of the communication parameter i for the device information j in Table 1 or the combination of the device information j and the communication parameter i, and $N_{ij}$ is the occurrence number of the communication parameter i for the device information j in Table 1, and i=1, 2, 3 . . . , j=1, 2, 3 . . . .

The priority levels of combinations of the device information and the communication parameters may then be determined in descending order based on the calculated occurrence probabilities of the combinations of the device information and the communication parameters.

In one embodiment, more specifically, a one-dimensional array composed of the combinations of the device information and the communication parameters may be established firstly after calculating the occurrence probabilities of all combinations as described above based on the combined sequence table. For example, the array may also be called a search array which may be represented as $S_{list}$ ({device, Para}), in which the values i and j identified for the device information and the communication parameter of each element are arranged in ascending order.

Thereafter, the one-dimensional array may be reordered or reorganized according to the occurrence probabilities $P_{ij}$ of all combinations of the device information and the communication parameters as calculated above. That is, the occurrence probabilities of combinations in the reorganized one-dimensional array are gradually reduced or increased from the first to the last. That is, in one embodiment, the combination of the communication parameter and the device information with the highest priority is arranged in the first position, while the combination of the communication parameter and the device information with the lowest priority is arranged in the last position.

Next, as shown in block S103, the apparatus or device inserted into the router may be recognized by using the corresponding communication parameters based on the priority levels of the combinations of the device information and the communication parameters as established above.

Specifically, the message may be firstly sent to the port apparatus to be recognized by the router through using the communication parameter of the combination (i.e., the current combination) of the device information and the communication parameter with the highest priority according to the priority levels as described above, and it can be determined whether the apparatus to be recognized is the device type of the used combination according to a feedback from the apparatus to be recognized. For example, if a corresponding answer signal can be received from the apparatus to be recognized, the current combination is the correct combination which may establish communication with the apparatus, i.e., the communication parameters of the current combination used is correct, and the apparatus to be recognized is the device type of the current combination. If no answer signal is received, it means that the used communication parameter does not correspond to the apparatus to be recognized. Then another message may be sent by using a communication parameter of the next combination in the order of priority levels as established above until an answer signal is received from the apparatus.

In one example, the combined sequence table may be further updated after receiving the answer signal from the port apparatus, as indicated by block S104. Specifically, if the communication parameter of the combination of the device information j and the communication parameter i is correct, the occurrence number $N_{ij}$ in the initial combined sequence table is updated to $N_{ij}+1$ after the apparatus is recognized. In other words, the correct communication parameter used for recognizing the apparatus may be saved to the combined sequence table as a new record. The updated combined sequence table may then be used as the combined sequence table for the subsequent apparatus recognition.

It should be noted that the operation of block S104 as described above is an optional operation, which may be omitted in some implementations of the disclosure.

In an embodiment of the disclosure, the combined sequence table may be based on historical identification statistics, built from the data record statistics collected when recognizing the apparatus previously, or may be preset based on factory requirements.

The method 100 as described above will be specifically described hereafter with a specific example.

Referring to Table 2 below, Table 2 shows a combined sequence table used in recognizing the apparatus, which includes two communication parameters USS (Universal Serial Interface Protocol) baud rate 9600 and USS baud rate 115200, and two device information V20 and MM440 (two different types of inverters) which may be connected with the IoT router.

TABLE 2

| Connected device information and communication parameters in a log file | V20 | MM440 |
|---|---|---|
| USS baud rate 9600 | 1 | 8 |
| USS baud rate 115200 | 4 | 0 |

The respective occurrence probabilities may be separately calculated for all combinations of the two device information and the two communication parameters according to the above combined sequence table. For example, the occurrence probability for the combination of the device V20 and the USS baud rate 9600 may be calculated by the following equation:

$$P_{V20,9600} = \frac{1}{1+4+8+0} = 7.7\% \qquad \text{equation (2)}$$

The occurrence probabilities for the other combinations may be calculated similarly, $P_{V20,115200}=30.8\%$, $P_{MM440,9600}=61.5\%$, $P_{MM440,115200}=0\%$.

In this way, a one-dimensional array $S_{list}$ may be established by all combinations based on the respective occurrence probabilities through the above calculations, i.e., $S_{list}=\{P_{MM440,9600}, P_{V20,115200}, P_{M4440,9600}, P_{M440,115200}\}$.

Thereafter, the one-dimensional array may be reordered or reorganized in descending order of the occurrence probability so as to establish priority levels for the combinations of the device information and the communication parameters. The reordered one-dimensional array may then be represented as $S_{list}=\{P_{MM440,9600}, P_{V20,115200}, P_{V20,9600}, P_{MM440,115200}\}$.

A message may be sent in the priority order in the reordered one-dimensional array when recognizing the port apparatus inserted into the router. According to Table 2, a message is firstly attempted to be sent using the communication parameter USS baud rate 9600 of the combination of the communication parameter USS baud rate 9600 and the device MM 440, such combination has the highest success rate.

Therefore, in the embodiment, for the inserted port apparatus, the expectation of the search time for recognizing may be characterized by the following equation:

$$E(S_{list})=\Sigma t_s S_{list}=1\times 61.5\%+2\times 30.8\%+3\times 7.7\%+4\times 0=1.46s \qquad \text{equation (3)}$$

Wherein, $t_s$ indicates the time for attempting a device information and a communication parameter (wherein, the numbers 1, 2 and 3 indicate the time at which the apparatus is recognized, such as the $1^{st}$ second, the $2^{nd}$ second, the $3^{rd}$ second, . . . ).

However, if as in the prior art, the messages are attempted to be sent sequentially based on the combined sequence table of Table 2 without setting priority levels, the expectation of the search time for recognizing may be characterized by the following equation:

$$E(S_{list})=\Sigma t_s S_{list}=1\times 7.7\%+2\times 30.8\%+3\times 61.5\%+4\times 0=2.54s \qquad \text{equation (4)}$$

It should be noted that the search time calculated by the two equations above is not the actual time taken to recognize the apparatus, but merely for the representation meaning.

Therefore, the apparatus recognition only takes 1.46 s of the search time in the embodiment of the disclosure compared with 2.54 s in the prior art, thereby the apparatus recognition time is significantly shortened and the recognition efficiency is improved.

In another embodiment of the disclosure, a device 200 for recognizing an apparatus is provided. The device 200 is configured to perform the method 100 for recognizing the apparatus as described above, and may include a reading module 201, a priority determining module 202 and a recognizing module 203.

The reading module 201 may read a combined sequence table stored in a memory or the like, and the combined sequence table may include candidate device information (hereinafter referred as device information), candidate communication parameter information (hereinafter referred as communication parameter) and historical occurrence numbers of combinations of the device information and the communication parameter.

The priority determining module 202 may determine the priority levels of combinations based on the occurrence numbers of the combinations of the device information and the communication parameter. For example, the priority determining module 202 may arrange the priority levels in descending order according to the occurrence numbers of the combinations of all the device information and the communication parameters. A message is sent to the apparatus to be recognized by using a corresponding communication parameter when recognizing the apparatus in such order. That is, the first message is sent to the apparatus to be recognized using the communication parameter of the combination with the highest occurrence number so that the success probability of the first recognition may be increased.

In an embodiment, the priority determining module 202 may calculate the occurrence probabilities of the combinations of the device information and the communication parameters based on the historical occurrence numbers of the combinations and the summation thereof in the combined sequence table. In an example, a one-dimensional array may be built, and may be reordered or reorganized according to the occurrence probabilities of combinations of the device information and the communication parameters. That is, the occurrence probabilities of combinations in the reorganized one-dimensional array are arranged in a gradually increasing order. That is, the combination with the highest priority is arranged in the first position, while the combination with the lowest priority is arranged in the last position.

The recognizing module 203 may send the messages to the apparatus to be recognized by using the communication parameters of the combinations in descending order, and determine whether the used combination is the correct combination capable of establishing communication with the apparatus to be recognized according to the feedback of the apparatus to be recognized, i.e., determine if the used parameter is the correct parameter. In an embodiment, the recognizing module 203 may begin to attempt to send a message to the port apparatus from the communication parameter of the combination with the highest priority according to the priority levels based on the reorganized one-dimensional array as described above.

Further, the apparatus 200 may further include an updating module 204 for updating the combined sequence table according to the apparatus recognition result.

For example, the recognizing module 203 may send a message to the port apparatus by the router through using the communication parameter of the combination with the highest priority, and recognize whether the apparatus to be recognized is the device type in the used current combination based on a feedback from the apparatus. For example, if a corresponding answer signal can be received from the port apparatus, it means that the communication parameter of the used current combination is correct, and the apparatus to be recognized is the device type of the used current combination. If no answer signal is received, it means that the used communication parameter does not correspond to the apparatus to be recognized. Then another message may be sent by using a communication parameter of the next combination in the order of priority levels as established above until a response signal is received from the apparatus. Thereafter, the updating module 204 may update the combined sequence table after receiving the answer signal from the port apparatus. Specifically, the occurrence number of the combination of the device information and the communication parameter where the communication parameter is located when sending the message may be increased by one.

The updated combined sequence table may then be used as the initial combined sequence table for the subsequent apparatus recognition when recognizing the next port apparatus.

It should be noted that the operation of the updating module 204 as described above is an optional operation, which may be omitted in some implementations of the disclosure.

Other optional implementations of the device 200 may refer to the foregoing method 100, which would not be described specifically herein.

Figure 3:
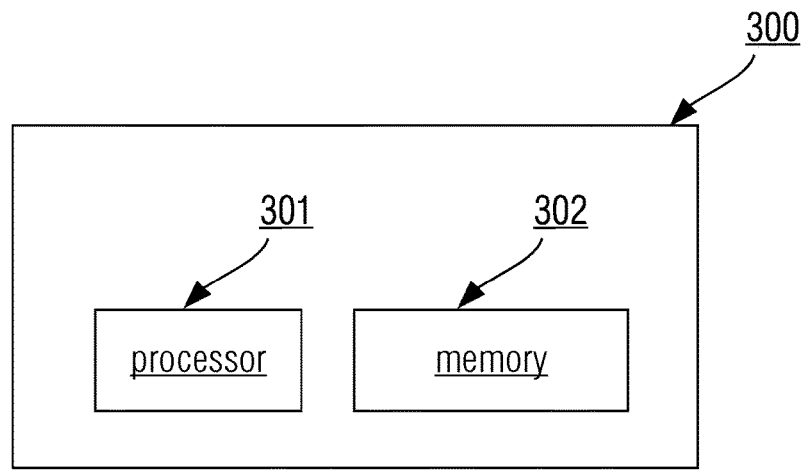
FIG. 3 is a schematic diagram of a device for recognizing an apparatus according to another embodiment of the disclosure.

Additionally, a device 300 for recognizing an apparatus is provided as shown in FIG. 3 according to another embodiment of the disclosure. The device may include a processor 301 and a memory 302. Application programs executed by the processor 301 may be stored in the memory 302 so that the processor 301 may perform the method 100 as described above for recognizing the apparatus. Thus, the combined sequence table used in recognizing the apparatus may be stored in the memory 302. Modules included in the device 200 may be optionally modules of application programs stored in the memory 302 of the device 200 shown in FIG. 3, and the modules implements respective functions when invoked by the processor 301. Alternatively, modules of the device 200 may also be implemented as functional modules implemented by a hardware, for example, the control logics of processes involved in the access control method may be integrated into a field programmable gate array or a complex programmable logic device (CPLD), and the functions of the above modules are executed by these chips or devices, the specific implementation may be determined according to the engineering practice.

Further, a computer readable storage medium having computer readable instructions stored therein for performing the method for recognizing an apparatus as described above is provided according to another embodiment of the disclosure.

Additionally, a computer program is provided according to another embodiment of the disclosure. The computer program may include computer readable instructions so that the method 100 described above may be performed by at least one of the processes when executed.

It should be noted that not all of the steps and modules in the processes and structural diagrams described above are necessary, and some steps or modules may be omitted according to actual requirements. The divisions of various modules are only used for convenience of description of the functional divisions. One module may be implemented by multiple modules while the functions of multiple modules may also be implemented by the same module in actual implementation, and these modules may be integrated into the same device or different devices.

The hardware modules in the various embodiments may be implemented mechanically or electronically. For example, a hardware module may include specially designed permanent circuits or logic devices (such as dedicated processors, for example, FPGAs or ASICs) for specific operations. The hardware modules may also include programmable logic devices or circuits (such as including general purpose processors or other programmable processors) temporarily configured by software for particular operations. The hardware module may be implemented by mechanical device(s), by using a dedicated permanent circuit, either or by temporarily configured circuits (as configured by software), which depends on cost and time considerations.

The disclosure also provides a machine readable storage medium storing instructions so that the method as described herein performed by a machine. Particularly, a system or apparatus equipped with a storage medium in which software program codes implementing the functions of any of the embodiments described above may be stored, and a computer (or CPU or MPU) of the system or apparatus may read and execute the program codes stored in the storage medium. In addition, a portion of or all of the actual operations may be performed by operating systems or the like operating of a computer based on instructions of the program codes. The program codes read from the storage medium is also possible to be written into a memory provided in an expansion board inserted into the computer or into a memory provided in an extension unit connected to the computer, and a portion of or all of the actual operations are then performed by the CPU and the like installed in the expansion board or the expansion unit based on the instructions of the program codes to implement the functions of any of the above embodiments.

Embodiments of the storage medium providing program codes may include floppy disks, hard disks, magneto-optical disks, optical disks (such as CD-ROM, CD-R, CD-RW, DVD-ROM, DVD-RAM, DVD-RW, DVD+RW), tape, non-volatile memory and ROM. Alternatively, the program codes may be downloaded from a server computer or cloud by a communication network.

Through various embodiments provided by the disclosure, the historical identification data is fully utilized to update and optimize the communication parameter searching order. In the process of actually recognizing the apparatus, a message may be firstly sent by using the communication parameter with the highest occurrence frequency, thereby increasing the probability of a successful recognition for the first time, significantly shortening the total time of the device recognition. As the device recognition is performed, the combined sequence table is updated in real time. The efficiency of the device recognition may be further increased since the priority level array of the searching recognition is changed by the previous recognitions of the inserted apparatuses. The recognition time may be significantly shortened by attempting to send messages to the apparatus to be recognized sequentially according to the priority levels when the recognition is performed.

The disclosure has been shown and described in detail with reference to the accompanying drawings and the embodiments, but the disclosure is not limited to these disclosed embodiments, and those skilled in the art may understand that the code reviews in the disclosure in the various embodiments described above may be combined to obtain more embodiments of the disclosure, which are also within the scope of the present disclosure.

What is claimed is:

1. A method for recognizing an apparatus by a router, comprising:
   reading a combined sequence table including candidate device information, candidate communication parameters and historical occurrence numbers of combinations of the candidate device information and the candidate communication parameters that enable the apparatus to be recognized by the router;
   determining priority levels of the combinations according to the historical occurrence numbers; and determining a current combination according to the priority levels, sending a message to the apparatus to be recognized by the router using a candidate communication parameter in the current combination, and determining whether the current combination is a correct combination capable of establishing a communication with the apparatus to be recognized, according to a feedback from the apparatus to be recognized to the router.

2. The method of claim 1, wherein the determining of whether the current combination is a correct combination capable of establishing a communication with the apparatus to be recognized, according to a feedback from the apparatus to be recognized comprises:
  determining that the current combination is the correct combination capable of establishing a communication with the apparatus to be recognized, upon receiving an answer signal fed back from the apparatus to be recognized.

3. The method of claim 2, further comprising:
  updating the combined sequence table so that the historical occurrence number of the current combination is increased by one after determining that the current combination is the correct combination capable of establishing a communication with the apparatus to be recognized.

4. The method of claim 2, wherein the determining of the priority levels of the combinations according to the historical occurrence numbers comprises:
  calculating an occurrence probability of each respective combination according to the respective historical occurrence number of each respective combination and a total occurrence number of the combinations; and
  determining the priority levels of the respective combinations according the respective occurrence probabilities in descending order.

5. The method of claim 4, wherein the determining of the priority levels of the combinations according to the occurrence probabilities in descending order comprises:
  establishing a one-dimensional array consisting of the combinations; and
  reordering all of the combinations within the one-dimensional array, in descending order according to respective occurrence probabilities of the respective combinations,
  wherein the determining of the current combination comprises determining the current combination from front to back, based on the reordered one-dimensional array.

6. The method of claim 1, further comprising:
  updating the combined sequence table so that the historical occurrence number of the current combination is increased by one after determining that the current combination is the correct combination capable of establishing a communication with the apparatus to be recognized.

7. The method of claim 1, wherein the determining of the priority levels of the combinations according to the historical occurrence numbers comprises:
  calculating an occurrence probability of each respective combination according to the respective historical occurrence number of each respective combination and a total occurrence number of the combinations; and
  determining the priority levels of the respective combinations according to the respective occurrence probabilities in descending order.

8. The method of claim 7, wherein the determining of the priority levels of the combinations according to the occurrence probabilities in descending order comprises:
  establishing a one-dimensional array consisting of the combinations; and
  reordering all of the combinations within the one-dimensional array, in descending order according to respective occurrence probabilities of the respective combinations,
  wherein the determining of the current combination comprises determining the current combination from front to back, based on the reordered one-dimensional array.

9. The method of claim 1, wherein the combined sequence table is created based on historical statistics data.

10. The method of claim 1, wherein the communication parameters include at least one of: baud rate and device address information.

11. A device for recognizing an apparatus by a router, comprising:
  a router having,
  a reading module configured to read a combined sequence table including candidate device information, candidate communication parameters and historical occurrence numbers of combinations of the candidate device information and the candidate communication parameters that enable the apparatus to be recognized by the router;
  a priority determining module configured to determine priority levels of the combinations according to the historical occurrence numbers; and
  a recognizing module configured to determine a current combination according to the priority levels, send a message to the apparatus to be recognized by the router by using a candidate communication parameter in the current combination, and determine whether the current combination is a correct combination capable of establishing a communication with the apparatus to be recognized according to a feedback from the apparatus to be recognized.

12. The device of claim 11, wherein the recognizing module is further configured to determine that the current combination is the correct combination capable of establishing a communication with the apparatus to be recognized, upon receiving an answer signal fed back from the apparatus to be recognized.

13. The device of claim 11, further comprising:
  an updating module configured to update the combined sequence table so that the historical occurrence number of the current combination is increased by one after determining that the current combination is the correct combination capable of establishing a communication with the apparatus to be recognized.

14. The device of claim 11, wherein the priority determining module is further configured to calculate an occurrence probability of each respective combination according to the historical occurrence number of each respective combination and a total occurrence number of the combinations, and determine the priority levels of the respective combinations according to the occurrence probabilities in descending order.

15. The device of claim 14 wherein the priority determining module is further configured to establish a one-dimensional array consisting of the combinations, and reorder all respective combinations within the one-dimensional array in descending order according to the respective occurrence probabilities of the respective combinations, and wherein the recognizing module is further configured to determine the current combination from front to back based on the reordered one-dimensional array.

16. A device for recognizing an apparatus, comprising:
a router having
at least one processor; and
a memory storing application programs, the at least one processor, when configured by the application programs, being configured to execute at least:
reading a combined sequence table including candidate device information, candidate communication parameters and historical occurrence numbers of combinations of the candidate device information and the candidate communication parameters that enable the apparatus to be recognized by the router;
determining priority levels of the combinations according to the historical occurrence numbers; and
determining a current combination according to the priority levels, sending a message to the apparatus to be recognized by using a candidate communication parameter in the current combination, and determining whether the current combination is a correct combination capable of establishing a communication with the apparatus to be recognized, according to a feedback from the apparatus to be recognized.

17. A non-transitory computer readable storage medium storing computer readable instructions for performing the method of claim 1 when executed by at least one processor.

18. A non-transitory computer program storing computer readable instructions, wherein the method of claim 1 is performed by at least one processor when the computer readable instructions are executed.

19. A non-transitory computer program product tangibly stored on a computer readable medium and storing computer executable instructions, wherein the method of claim 1 is performed by at least one processor when the computer readable instructions are executed.

* * * * *